United States Patent [19]

Abrams et al.

[11] Patent Number: 4,494,827
[45] Date of Patent: Jan. 22, 1985

[54] IMAGING APPARATUS FOR TRANSVERSE ELECTRODE ELECTRO-OPTIC TUNABLE FILTER

[75] Inventors: Richard L. Abrams, Pacific Palisades; David M. Henderson, Playa Del Rey, both of Calif.; Douglas A. Pinnow, Cheshire, Conn.; Ronald R. Stephens, West Lake Village, Calif.

[73] Assignee: The United States of America as represented by the Secretary of the Air Force, Washington, D.C.

[21] Appl. No.: 435,522

[22] Filed: Oct. 20, 1982

[51] Int. Cl.³ .............................................. G02F 1/03
[52] U.S. Cl. .................................... 350/385; 350/374
[58] Field of Search ............... 350/388, 385, 356, 374, 350/96.14, 96.13

[56] References Cited

U.S. PATENT DOCUMENTS

| | | | |
|---|---|---|---|
| 2,152,807 | 4/1939 | Klingsporn | 350/385 |
| 2,600,962 | 6/1952 | Billings | 88/65 |
| 3,531,181 | 9/1970 | Scarrott | 350/385 |
| 3,695,745 | 1/1970 | Furukawa | 350/385 |
| 3,935,543 | 1/1976 | Eguchi et al. | 331/94.5 M |
| 4,056,307 | 11/1977 | Rayces | 350/181 |
| 4,197,008 | 4/1980 | Pinnow et al. | 350/150 |
| 4,318,583 | 3/1982 | Goshima et al. | 350/6.6 |

OTHER PUBLICATIONS

D. A. Pinnow, R. L. Abrams, J. F. Lotspeich, D. M. Henderson, T. K. Plant, R. R. Stephens, and C. M. Walker, "An Electro-Optic Tunable Filter", Applied Physics Letters, Mar. 15, 1979, pp. 391–393.

*Primary Examiner*—Bruce Y. Arnold
*Attorney, Agent, or Firm*—Donald J. Singer; Frank J. Lamattina

[57] ABSTRACT

An imaging apparatus which permits the use of a transverse electrode electro-optic tunable filter (TEOTF), despite its obscured aperture, to produce a high quality image. The imaging apparatus includes a suitable conventional anamorphic input optical system in combination with a stacked plurality of TEOTFs in which the platelet of each TEOTF is made of an electro-optic material of a known index of refraction (such as CdS of an index of ~2.4), and is clad between its surface and its electrodes with a material having a lower index of refraction than the platelet material (such as $SiO_2$ of an index of ~1.5).

5 Claims, 5 Drawing Figures

IMAGING APPARATUS FOR TRANSVERSE ELECTRODE ELECTRO-OPTIC TUNABLE FILTER

STATEMENT OF GOVERNMENT INTEREST

The invention described herein may be manufactured and used by or for the Government for governmental purposes without the payment of any royalty thereon.

BACKGROUND OF THE INVENTION

This invention relates to optical filters and more particularly to imaging with a transverse electrode (or, as sometimes referred to, a "transverse field") electro-optic tunable filter (hereinafter referred to as TEOTF) assembly.

A TEOTF is a device for electronically controlling the transmission characteristics (e.g., wavelength, linewidth, peak transmission, etc.) of an optical filter by the application of voltages to certain birefringent crystals. One filter of such a type is the longitudinal electro-optic tunable filter (hereinafter referred to as LEOTF) which utilizes transparent electrodes to apply voltages to the filter. Since the electrodes are transparent, the light is unaffected by their presence, so that one can easily image through a LEOTF. However, transparent electrodes are not easily attainable. To avoid their need, another type of electro-optic tunable filter was devised, and it is known as the transverse electrode (or field) electro-optic tunable filter (i.e., the TEOTF previously referred to). Although a TEOTF has the obviously great advantage of not requiring transparent electrodes, the TEOTF has the obviously equally great disadvantage that the electrodes obscure the aperture and thereby "destroy" (i.e., significantly and adversely effect) the quality of the image transmitted by the TEOTF.

Although an apparatus and/or method of using the TEOTF with an imaging system without destroying the quality of the image transmitted by the TEOTF is highly desirable, no such prior art apparatus and/or method is known.

It would be fair and accurate to say that apparently the art has accepted the belief that the use of the TEOTF inherently involves its obscured aperture and resulting very poor quality image.

SUMMARY OF THE INVENTION

The instant invention permits the use of the TEOTF, despite its obscured aperture, in an imaging apparatus to produce a high quality image, and thereby constitutes a significant advance in the state-of-the-art. Specifically, applicants have discovered that high quality imaging through the TEOTF can be achieved by the simultaneous use of anamorphic input optics and of optical cladding layers on the platelet of the TEOTF. This novel combination results in optical wave guide propagation in the direction between electrodes of the TEOTF platelet, and unguided propagation in the direction parallel to the electrodes, thereby allowing high quality images to be transmitted through the TEOTF. More specifically, anamorphic optics are used to tailor the input radiation distribution to the two modes of propagation.

Accordingly, it is an object of the instant invention to provide an imaging apparatus in which a TEOTF (or an assembly of TEOTFs) is used without the usual significant deterioration of image quality.

It is another object of this invention to provide an imaging apparatus in which a TEOTF (or a TEOTF assembly) is used in combination with a suitable conventional anamorphic input optics system means to allow images of high quality to be transmitted through the TEOTF or TEOTF assembly.

These objects of the instant invention, as well as other objects related thereto, will become readily apparent after a consideration of the description of the instant invention, together with reference to the contents of the Figures of the drawing.

DESCRIPTION OF THE PREFERRED EMBODIMENT

Figure 1:
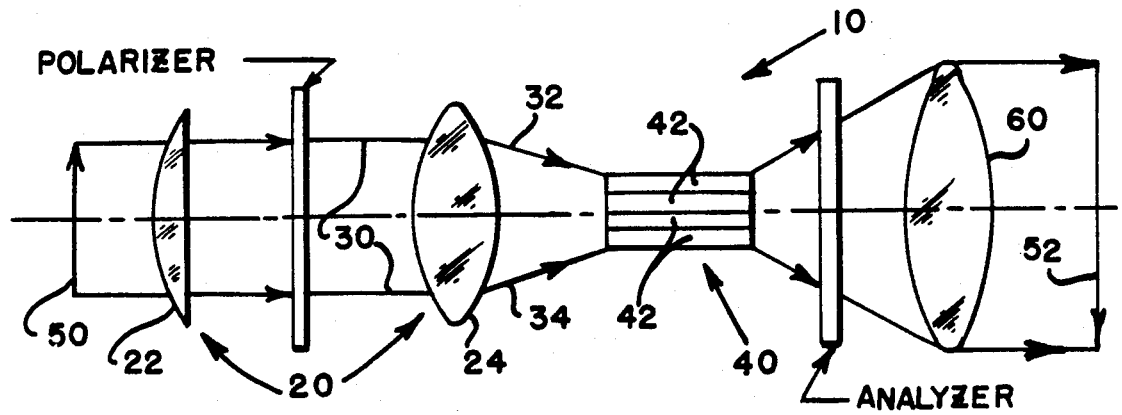
FIG. 1 is a side elevation view, in simplified schematic form, of a preferred embodiment of the instant invention.

With reference to FIG. 1-4, inclusive, the preferred embodiment 10 of the instant invention, in its most basic and generic structural form, comprises: an anamorphic (input) optical system means (generally designated 20, FIG. 1) for transmitting and focusing a beam of polarized light (such as 30, FIG. 1, with edge rays 32 and 34) which is carrying an image 52 of an object (such as 50, FIG. 1); and, a large aperture TEOTF assembly (such as 40, FIGS. 1-3, inclusive) which is in optical alignment with the anamorphic optical system means 20 and which includes a plurality of transverse field electro-optic filters (each of which said TEOTFs is similarly designated 42, FIGS. 1-4, inclusive) in a stacked relationship (best seen in FIGS. 1 and 3), with each TEOTF 42 of the plurality 40 having electrodes (such as 44, FIG. 4) and comprising a platelet (such as 46, FIGS. 3 and 4) made of electro-optic material of a known index of refraction, and with each platelet 46 being clad between its surface and its electrodes 44 with a material (such as 48, FIG. 4) having a lower index of refraction than the platelet material 46.

It is here to be noted that although a plurality of stacked TEOTFs 40 is preferred, a single TEOTF 42 could be used.

It is here also to be noted: that the platelets 46 could be made of cadmium sulphide (CdS), or lithium tantalite (LiTaO$_3$), or other suitable material; that the cladding material 48 could be silicon dioxide (SiO$_2$) or other suitable material; and that the electrodes 44 could be made of gold (Au) or other suitable material.

It is further to be noted that any suitable conventional anamorphic optical system means 20 can be used.

MANNER OF USE AND OPERATION OF THE PREFERRED EMBODIMENT

The manner of use, and of operation, of the preferred embodiment 10 of the instant invention can be easily ascertained by any person of ordinary skill in the art, from the foregoing description, coupled with reference to the contents of the Figures of the drawing.

For others, the following explanation is given. Concisely stated, imaging through the assembly 40 of TEOTFs, 42 can be achieved by the use, in combination, of an anamorphic input optics system 40 (schematically represented in FIG. 1 by constituent lens components 22 and 24), and of optical cladding layers 48 on the filter platelets 46.

Figure 2:
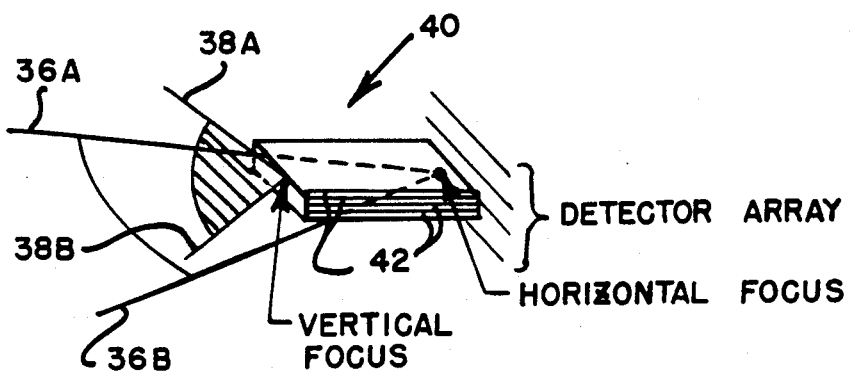
FIG. 2 is a perspective view, in very simplified schematic form, of a stacked assembly of TEOTFs, which is useable as a constituent of the preferred embodiment of the instant invention, shown in FIG. 1, to illustrate the phenomenon resulting from the use of an anamorphic optical system with the TEOTF assembly.
Figure 3:
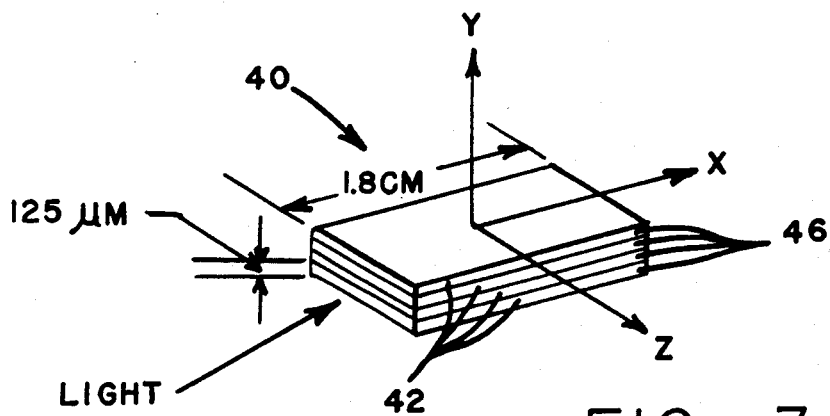
FIG. 3 is a perspective view, in simplified schematic and pictoral form, of the representative TEOTF assembly which is shown in FIG. 2.

More specifically, and with reference to FIG. 2, light rays (such as 36A and 36B) of beam 30 which are in the horizontal plane are focused, as shown by legend, on the ouput of the TEOTF assembly 40. These rays 36A and 36B do not interact with the TEOTF surfaces, and freely propagate to a focus at the output. However, light rays (such as 38A and 38B) of beam 30 which are in the vertical plane will interact with the TEOTF surfaces; are optically guided through the platelets 46; and the TEOTFs 42 relay the focus (designated by legend) from the input to the output. For a point source input in both planes, the anamorphic input optics 20 provides the two focal points and the TEOTF assembly 40 relays the input vertical focus to the same output location as the horizontal focus. In this fashion the input point source is replicated at the output plane. All other point sources of an image will pass through the TEOTF assembly stack 40 in a similar fashion. The image (such as 52, FIG. 1) can be detected at the TEOTF assembly 40 output with an array of detection elements, as shown and legended in FIG. 2, which are matched in size to the filter platelets 46. The image 52, FIG. 1, can also be relayed to a remote location (as is shown in FIG. 1) with the use of intervening optics, such as imaging lens 60, FIG. 1. Optical waveguiding in the filter platelets 46 is achieved by depositing a lower index cladding material 48, FIG. 4, on each platelet 46 before the gold electrodes 44 of the platelet 46 are deposited. With this cladding 48, light which is propagating at angles less than that for total internal reflection will be guided. In addition, the cladding 48 serves to shield the propagating light from the electrodes 44 which would otherwise attenuate the optical radiation.

Figure 4:
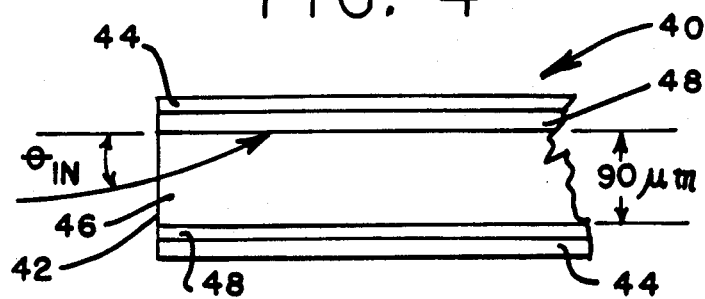
FIG. 4 is a side elevation view, in simplified schematic form, in cross section and partially fragmented, of a single representative constituent TEOTF (of an assembly of TEOTFs) of the instant invention, showing the composition and structure of the platelet of the TEOTF.
Figure 5:
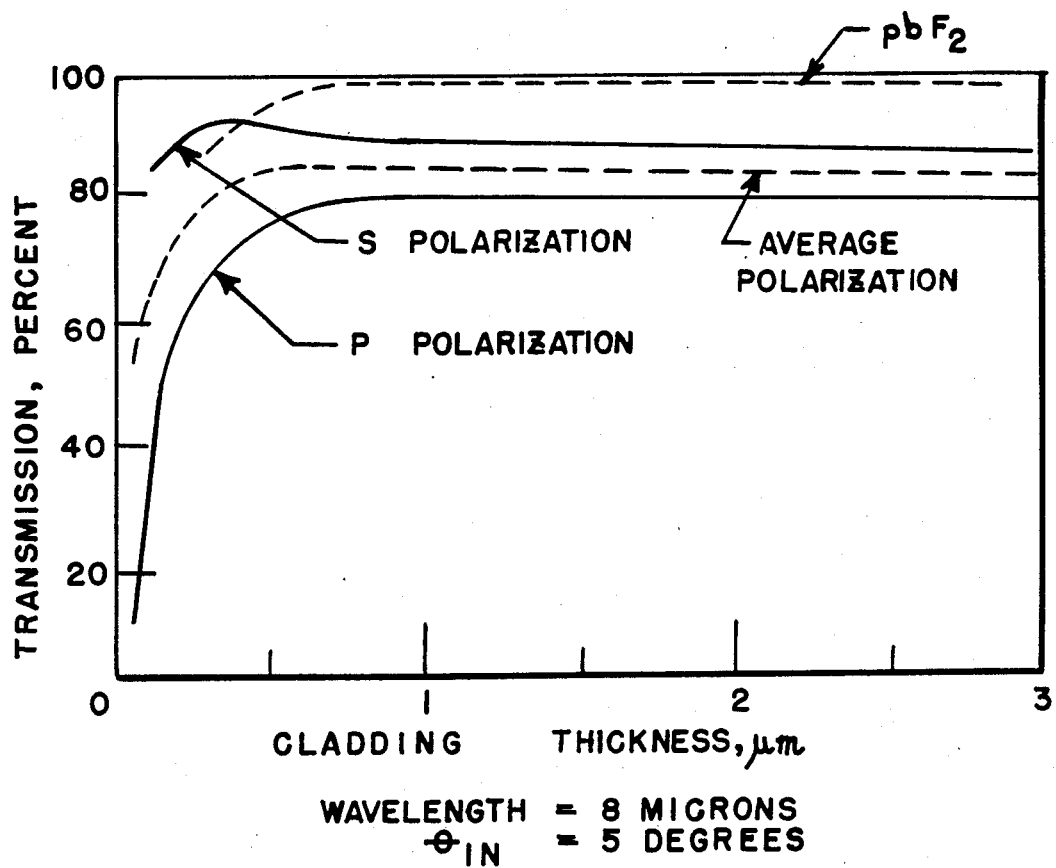
FIG. 5 is a graphical representation of the transmission of light down the TEOTF platelet (which is shown in FIG. 4) as a function of the cladding thickness.

These considerations are displayed in FIG. 5 in graph form, in which the transmission of light down a filter platelet 46, FIG. 4, which is 25mm long is shown as a function of cladding 48 thickness. The curve is plotted for an $SiO_2$ cladding 48 of index $\sim$ 1.5 on a CdS platelet 46 with an index $\sim$ 2.4. In the calculation the gold electrodes 44 are assumed to cover the entire surface. For cladding 48 thickness less than $\sim$ 1.2 $\mu$m the attenuation by the electrodes dominates. For thicker cladding layers 48 the electrodes 44 are effectively shielded, and the transmission is unaffected by eletrode losses. Thus, the clad filter platelet (such as 46, FIG. 4) is an effective way of guiding the light through a TEOTF 42 or a stacked assembly of TEOTFs 40.

CONCLUSION

It is abundantly clear from all of the foregoing, and from the contents of the Figures of the drawing, that the stated objects of the instant invention, as well as other objects relative thereto, have been achieved.

It is to be noted that, although there have been described and shown the fundamental features of the instant invention, as applied to a preferred embodiment 10, nevertheless various other embodiments, variations, substitutions, additions, omissions, and the like may occur to, and can be made by those of ordinary skill in the art. For example, the instant invention may be adapted for use for programmable spectral filtering.

What is claimed is:

1. An apparatus for imaging, comprising:
   a. an anamorphic optical system means for transmitting and focusing a beam of polarized light carrying an image; and
   b. a large aperture electro-optic tunable filter assembly having an entrance surface and an exit surface in optical alignment with said anamorphic optical system means, wherein said filter assembly includes at least one transverse field electro-optic tunable filter having electrodes, with said filter comprising a platelet of electro-optic material of a known index of refraction, and with said platelet being clad between its surface and said electrodes with a material having a lower index of refraction than said platelet material and wherein said anamorphic optical system focuses in a first direction an image onto said entrance surface and focuses in a second direction orthogonal to the first direction an image onto said exit surface.

2. An apparatus for imaging, as set forth in claim 1, wherein said large aperture electro-optic tunable filter assembly comprises a plurality of said transverse field electro-optic tunable filters disposed in a stacked relationship.

3. An apparatus for imaging, as set forth in claim 2, wherein each of said platelets is made of cadmium sulphide and said cladding material is silicon dioxide.

4. An apparatus for imaging, as set forth in claim 2, wherein each of said platelets is made of lithium tantalate and said cladding material is silicon dioxide.

5. A method of imaging a beam of polarized light carrying an image, comprising the steps of:
   a. disposing an anamorphic optical system in optical alignment with said polarized beam of light; and
   b. disposing a large aperture electro-optic tunable filter assembly having an entrance surface and an exit surface in optical alignment with said anamorphic optical system, wherein said filter assembly includes a plurality of transverse field electro-optic tunable filters in a stacked relationship, with each filter having electrodes and comprising a platelet of electro-optic material of a known index of refraction, and with each platelet being clad between its surface and said electrodes with a material having a lower index of refraction than said platelet material an wherein said anamorphic optical system focuses in a first direction an image onto said entrance surface and focuses in a second direction orthogonal to the first direction an image onto said exit surface.

* * * * *